US012589519B2

(12) United States Patent
Josefsson et al.

(10) Patent No.: US 12,589,519 B2
(45) Date of Patent: Mar. 31, 2026

(54) ARRANGEMENT AND METHOD FOR FORMING GROOVES IN A BOARD ELEMENT

(71) Applicant: Ceraloc Innovation AB, Viken (SE)

(72) Inventors: Per Josefsson, Ramlösa (SE); Richard Jolfson, Jonstorp (SE); Mattias Kjellberg, Halmstad (SE); Tomas Petersson, Halmstad (SE)

(73) Assignee: CERALOC INNOVATION AB, Viken (SE)

( * ) Notice: Subject to any disclaimer, the term of this patent is extended or adjusted under 35 U.S.C. 154(b) by 635 days.

(21) Appl. No.: 18/055,473

(22) Filed: Nov. 15, 2022

(65) Prior Publication Data

US 2023/0150164 A1      May 18, 2023

(30) Foreign Application Priority Data

Nov. 16, 2021    (SE) ..................................... 2151394-0
Nov. 16, 2021    (SE) ..................................... 2151395-7

(51) Int. Cl.
B27F 1/02          (2006.01)
B23B 13/12        (2006.01)
B23Q 1/54         (2006.01)
(52) U.S. Cl.
CPC .............. B27F 1/02 (2013.01); B23B 13/126 (2013.01); B23Q 1/5406 (2013.01)
(58) Field of Classification Search
None
See application file for complete search history.

(56) References Cited

U.S. PATENT DOCUMENTS

| 4,687,901 | A | * | 8/1987 | Binder | ................... | B23K 26/02 |
|           |   |   |        |        |                    | 219/121.67 |
| 2010/0111599 | A1 | * | 5/2010 | Baur | ........................ | B23C 5/14 |
|           |   |   |        |        |                    | 403/350 |

(Continued)

FOREIGN PATENT DOCUMENTS

| CN | 111673838 A | 9/2020 |
| CN | 111946009 A | 11/2020 |

(Continued)

OTHER PUBLICATIONS

Office Action issued by Swedish Patent and Registration Office (PRV) on Jun. 1, 2022 in Swedish Patent Application No. 2151394-0 (7 pages).

(Continued)

*Primary Examiner* — Jacob T Minskey
*Assistant Examiner* — Adrien J Bernard
(74) *Attorney, Agent, or Firm* — Boone IP Law

(57) ABSTRACT

An arrangement for forming grooves in a board element. The arrangement includes a support member for supporting the board element during the forming and cutting elements arranged on a spindle member configured to rotate around a rotational axis. The cutting elements are configured to form the grooves by removing material from the board element. The spindle member is arranged in a pivot body configured to be pivoted with respect to the support member. The arrangement includes a driving device configured to drive the pivot body, wherein the driving device is configured to rotate in a single direction during a groove forming cycle.

20 Claims, 8 Drawing Sheets

(56) References Cited

U.S. PATENT DOCUMENTS

| | | | | |
|---|---|---|---|---|
| 2011/0203703 A1* | 8/2011 | Otsuka | .................... | B27D 1/10 |
| | | | | 144/363 |
| 2015/0040732 A1* | 2/2015 | Ozawa | .................... | B23B 3/161 |
| | | | | 82/121 |
| 2017/0305027 A1 | 10/2017 | Broeker | | |
| 2022/0063167 A1 | 3/2022 | Josefsson et al. | | |

FOREIGN PATENT DOCUMENTS

| | | | |
|---|---|---|---|
| EP | 0362833 | A2 | 4/1990 |
| JP | 2002-254426 | A | 9/2002 |
| WO | 2014/007738 | A1 | 1/2014 |
| WO | 2020/180237 | A1 | 9/2020 |

OTHER PUBLICATIONS

Office Action issued by Swedish Patent and Registration Office (PRV) on Jun. 1, 2022 in Swedish Patent Application No. 2151395-7 (7 pages).

International Search Report and Written Opinion received for PCT Patent Application No. PCT/SE2022/051066, mailed on Dec. 6, 2022, 11 pages.

U.S. Appl. No. 17/463,902, filed Sep. 1, 2021, Per Josefsson.

U.S. Appl. No. 17/705,465, filed Mar. 28, 2022, Per Josefsson.

U.S. Appl. No. 17/831,826, filed Jun. 3, 2022, Per Josefsson.

U.S. Appl. No. 18/209,359, filed Jun. 13, 2023, Per Josefsson.

U.S. Appl. No. 18/209,667, filed Jun. 14, 2023, Per Josefsson.

U.S. Appl. No. 18/210,429, filed Jun. 15, 2023, Per Josefsson.

U.S. Appl. No. 18/495,918, filed Oct. 27, 2023, Per Josefsson.

U.S. Appl. No. 18/295,559, filed Apr. 4, 2023, Darko Pervan.

U.S. Appl. No. 17/812,281, filed Jul. 13, 2022, Darko Pervan.

Extended European Search Report issued by European Patent Office on Jul. 4, 2025 in European Patent Application No. 22896217.1, 7 pages.

* cited by examiner

ARRANGEMENT AND METHOD FOR FORMING GROOVES IN A BOARD ELEMENT

CROSS REFERENCE TO RELATED APPLICATIONS

The present application claims the benefit of Swedish application no. 2151394-0, filed on Nov. 16, 2021 and of Swedish application no. 2151395-7, filed on Nov. 16, 2021. The entire contents of each of Swedish application no. 2151394-0 and Swedish application no. 2151395-7 are hereby incorporated herein by reference in their entirety.

TECHNICAL FIELD

The disclosure generally relates to an arrangement for removing material from a board element, which for example may be or may be dividable into a building panel, a floor panel, a wall panel, a furniture component, or a ceiling panel. More specifically, the disclosure relates to an arrangement for forming grooves in a board element by means of at least one cutting element arranged on a spindle member. The disclose also relates to an associated method for forming such grooves.

BACKGROUND

There is an increased demand for decreasing the weight of panels, such as floor panels, especially panels comprising a thermoplastic material. WO 2013/032391 and WO 2014/007738 disclose that such panels may be provided with a certain groove structure in their rear sides for decreasing their weight.

WO 2020/180237 A1 discloses methods and systems for forming grooves in a rear side of a board element, e.g., by a rotating cutting device. For example, the method may comprise a step of counteracting a displacement of the board element away from a support member during forming of the grooves.

The disclosure WO 2022/050891 relates to more controlled and energy efficient methods and arrangements for forming grooves in a board element, according to which a board portion of a board element may be disposed at an elevated temperature.

However, there is still need for even further improved arrangements and methods for forming such grooves.

SUMMARY

It is therefore an object of at least certain embodiments of the present disclosure to provide an improved arrangement that may provide a more effective and/or more energy efficient forming of grooves in a board element.

Another object of at least certain embodiments of the present disclosure is to provide an arrangement that may improve a control, such as a precision, of such forming of grooves.

A further object of at least certain embodiments of the present disclosure is to decrease stress on and/or wear of the arrangement, such as on its cutting elements.

Yet another object of at least certain embodiments of the present disclosure is to provide an arrangement that may reduce an idle time in the manufacturing of board elements.

It is also an object to provide a related method in accordance with any of the objects above.

These and other objects and advantages that will be apparent from the description have been achieved by the various aspects, embodiments and examples described below.

In accordance with a first aspect of the disclosure, there is provided an arrangement for forming grooves in a board element. The arrangement comprises a support member for supporting the board element during the forming, and at least one cutting element arranged on a spindle member configured to rotate around a rotational axis. The cutting element(s) are configured to form the grooves by removing material, such as chips, from the board element.

Generally, herein, the board element may be or may be dividable into a building panel, a floor panel, a wall panel, a furniture component, a ceiling panel, etc.

Throughout the present disclosure reference will be made to the forming of grooves. It is implicitly understood that this may include the forming of at least one groove, such as a plurality of grooves, by means of at least one cutting element, such as a plurality of cutting elements.

The arrangement may further comprise a feeding unit for feeding the board element along a feeding direction.

The spindle member may be arranged in a pivot body configured to be pivoted with respect to the support member. Thereby, a small angular displacement of the pivot body may cause a large displacement of portions of the pivot body, such as of a shaft unit comprising the spindle member.

The arrangement may further comprise a driving device configured to drive the pivot body, wherein the driving device preferably is configured to rotate in a single direction during a groove forming cycle. The driving device may be configured to drive the pivot body such that it pivots. By means of this embodiment, the spindle member may be repeatedly pivoted towards and away from the support member, without having to reverse the rotational direction of the driving device. This is to be contrasted with known cutters, which may be (linearly) displaced, e.g., using a ball screw, and which therefore require that the motor driving the displacement operates in two opposite rotational directions. Thereby, the forming of grooves may become more effective and/or more energy efficient.

The groove forming cycle may include a forming of grooves in a board element by the cutting elements, preferably at least when the spindle member assumes a forming position. In a first example, a single group of grooves are formed in the board element. In a second example, at least two groups of grooves are formed in the board element, wherein the groups are separated along the feeding direction. In the first and second examples, the cutting elements may separately process the board element one time and at least two times, respectively, preferably by pivoting the pivot body. The driving device may operate continuously or intermittently during the groove forming cycle. For example, the driving device may operate continuously (continuously or intermittently) when forming one group of grooves (at least two groups of grooves). During the continuous operation, the driving device may rotate uninterruptedly, preferably in said single direction. During the intermittent operation, the driving device may be non-rotating during some periods and rotating during other periods, for example in said single direction. Optionally, the groove forming cycle may include a displacement range spanning the time period from the forming position of the spindle member to a released position thereof.

In some embodiments, the driving device may be configured to rotate mainly in a single direction during a groove forming cycle. For example, the driving device may be configured to rotate in a single direction during at least 75%, preferably at least 90%, more preferably at least 97%, of an active rotational time period of the driving device. The active rotational time period may be a time period during the groove forming cycle during which the driving device de facto rotates and/or drives the rotation. During the remaining active rotational time period, the driving device may optionally compensate for overdrive. For example, the driving device may temporarily rotate in a direction opposite to said single direction. In non-limiting examples, the active rotational time period may be 5-6000 ms, preferably 10-4500 ms, more preferably 15-3500 ms.

The pivoting may be actuated by a connecting arm coupled to the pivot body, wherein the connecting arm is further coupled to a driving device. This embodiment may implement the rotation of the driving device in a single direction in a simple and effective manner.

The connecting arm may be coupled eccentrically to the driving device. Thereby, a rotational motion of the driving device may be converted into an essentially linear, such as vertical, motion of the connecting arm.

The pivot body may comprise a counterweight unit and a shaft unit comprising the spindle member, wherein the counterweight unit is adapted to at least partly counterbalance the shaft unit. Thereby, a faster response of the pivoting may be provided. Moreover, a smaller force and consequently a less powerful driving device may be needed for driving the pivoting displacement. Hence, a more energy efficient driving mechanism of the forming of grooves may be provided. Also, an improved regulation of the displacement of the spindle member may be provided.

The arrangement may further comprise a restriction member configured to restrict the pivoting of the pivot body. Thereby, the cutting elements may be prevented from removing material when the pivot body is pivoted against the support member beyond a certain maximal angle. This may increase the safety and control of the arrangement.

Both a first and a second supporting portion of the spindle member may be rotatably arranged in the pivot body. By means of this embodiment, a mounting of the spindle member, such as a journaling thereof, may be less exposed to stresses, especially during the forming of the grooves and/or during a high rotation speed of the spindle member. Indeed, a conventional shaft is typically mounted in only one of its end portions in a fixed structure. Moreover, a risk of bending the spindle member and/or a risk of the spindle member starting to swing during operation thereof may be reduced. Such a risk may be substantial for, e.g., long and/or heavy spindle members. Additionally, a rigidity of the mounting of the spindle member may increase. For example, a larger number of cutting elements may be arranged thereon.

Generally, herein, the spindle member may be configured to be rotatably driven by a drive unit. In some embodiments, an edge portion of the spindle member in or adjacent to the first supporting portion may be configured to be rotatably driven by a drive unit. The cutting elements may be accessible and replaceable from the side of the second supporting portion. Thereby, a straightforward and simple replaceability of the cutting elements may be maintained.

A plurality of cutting elements may be arranged in a cutting module, which may be removably arranged on the spindle member. Thereby, a plurality of cutting elements may be replaced simultaneously, whereby, e.g., an idle time of the arrangement may be reduced. Indeed, a quick and simple replacement of the cutting elements may be provided. A risk of damaging the cutting elements may also be decreased, such as during their replacement. Moreover, replacements, calibrations, and adjustments, such as balancing, of individual cutting elements in the module may be performed in an area which is remote from the arrangement. For example, the cutting module may be accessible and replaceable from the side of the second supporting portion.

The spindle member may be axially displaceable along the rotational axis. The spindle member may thereby be positioned in a transverse direction relative to the support member and/or the board element, preferably before, but, in some embodiments, even during, the forming of the grooves. Hence, the groove(s) may be positioned more precisely on the board element along the transverse direction. Additionally, there is no need to adjust an aligning element along the transverse direction, cf. the aligning element of WO 2020/180237 A1. Thereby, a transverse adjustment of components of an entire production line situated upstream from the arrangement, which may include board forming devices, board transportation devices etc., may become redundant.

The axial displacement may be caused by a worm drive assembly. Thereby, a continuous transverse positioning may be provided, and the precision of the groove forming may increase.

The support member may comprise at least two separated support elements which may be displaceable along a feeding direction of the board element. Generally, an improper positioning of such separated support elements with respect to the cutting elements may cause the board element to be displaced away, for example vertically upwards and/or angularly outwards, from the support member during the rotational processing. However, by means of this embodiment, whereby the support elements may be positioned along the feeding direction relative to the cutting elements, such a displacement of the board element away from the support member may be counteracted. For example, the support elements may be rotatably arranged rollers, whose top portions may be separated from each other.

In accordance with a second aspect of the disclosure, there is provided a method for forming grooves in a board element. The method comprises arranging the board element in contact with a support member, and forming at least one groove in a rear side of the board element by removing material from the board element by at least one cutting element arranged on a spindle member configured to rotate around a rotational axis.

Embodiments of the second aspect are largely analogous to embodiments of the first aspect, whereby reference is made thereto. In addition, the following embodiments are contemplated, which, in addition, are capable of being implemented in an arrangement in accordance with any of the embodiments of the first aspect.

The method may further comprise feeding the board element along a feeding direction.

The method may comprise pivoting the spindle member with respect to the support member during the forming.

The method may further comprise driving a pivot body in which the spindle member is arranged by a driving device, preferably configured to rotate in a single direction during a groove forming cycle.

The method may comprise actuating the pivoting by a connecting arm coupled to a pivot body in which the spindle member is arranged. The connecting arm may be coupled eccentrically to a driving device.

A counterweight unit may at least partly counterbalance a shaft unit comprising the spindle member.

The method may further comprise restricting the pivoting of the spindle member by means of a restriction member.

Both a first and a second supporting portion of the spindle member may be rotatably arranged in a pivot body.

A plurality of cutting elements may be arranged in a cutting module, which may be removably arranged on the spindle member.

The spindle member may be axially displaceable along the rotational axis.

The support member may comprise at least two separated support elements which are displaceable along a feeding direction of the board element. For example, the support elements may be rollers.

Aspects of the disclosure has mainly been described above with reference to a few embodiments. However, as is readily appreciated by a person skilled in the art, other embodiments than the ones disclosed above are equally possible within the scope of aspects of the disclosure.

Generally, all terms used in the claims and in the items in an embodiment section below are to be interpreted according to their ordinary meaning in the technical field, unless explicitly defined otherwise herein. All references to "a/an/ the [element, device, component, means, step, etc.]" are to be interpreted openly as referring to at least one instance of said element, device, component, means, step, etc., unless explicitly stated otherwise. Reference to one or a plurality of "at least one element", etc., may shortly be referred to as "the element(s)".

BRIEF DESCRIPTION OF THE DRAWINGS

The disclosure will in the following be described in connection to exemplary embodiments and in greater detail with reference to the appended exemplary drawings, wherein:

FIGS. 1a-1b illustrate in perspective views an embodiment of an arrangement for forming grooves and of an upper portion of the arrangement including a pivot body.

FIG. 1c illustrates in an enlarged perspective view an embodiment of the board element in FIG. 1a.

FIGS. 5a-5b illustrate embodiments of portions of the arrangement in FIG. 1a in a front view and a cross-sectional side view along the line B-B in FIG. 4a.

Figures 7A, 7B, 7C, 7D, 7E:
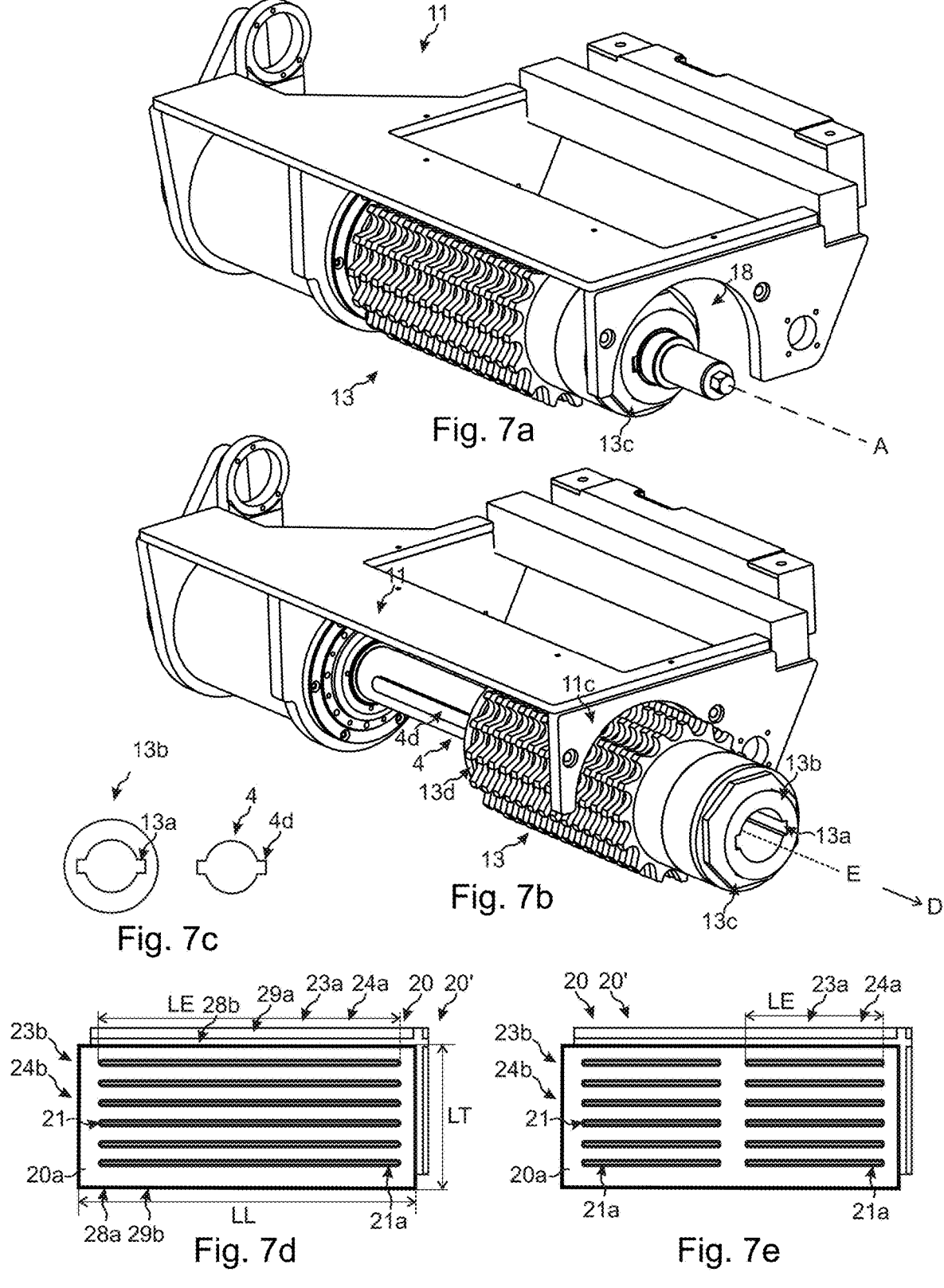
FIGS. 7a-7c illustrate embodiments of a shaft unit comprising a cutting module in perspective views and, in side views or cross-sectional side views, embodiments of a spindle member and an inner portion of a cutting module or a cutting element (FIG. 7c).

FIGS. 7d-7e illustrate embodiments of a building panel, such as a floor panel, comprising grooves formed in accordance with embodiments described herein.

Figures 8A, 8B:
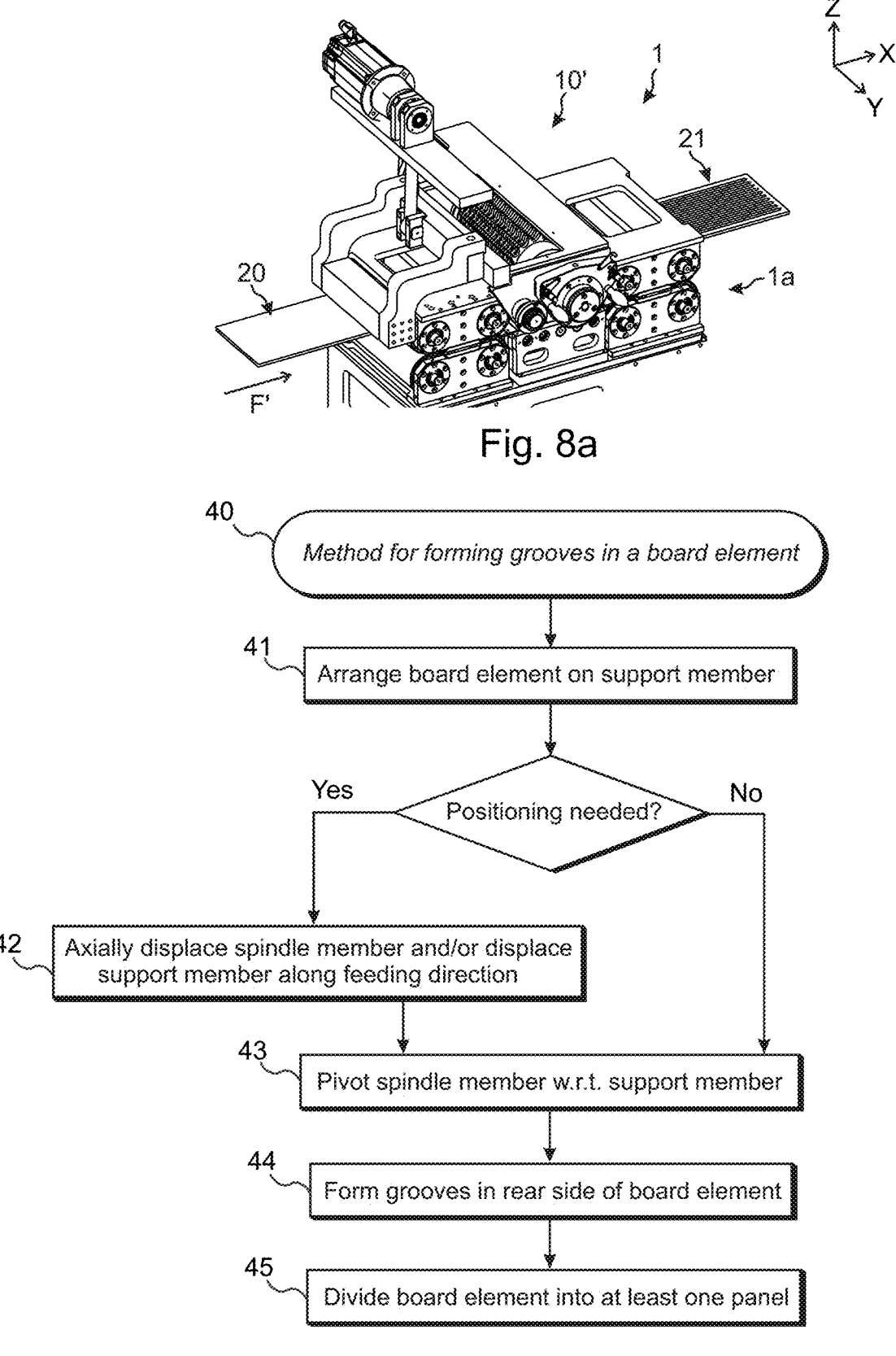

FIG. 8a illustrates in a perspective view an embodiment of an arrangement for forming grooves comprising a reversed pivot body.

FIG. 8b illustrates an embodiment of a method capable of being implemented in any of the arrangements in, e.g., FIGS. 1a-1b, 2a-2b, 3a-3g, 4a-4c, 5a-5b, 6a-6d, 7a-7c and 8a.

DETAILED DESCRIPTION

Figures 1A, 1B, 1C:
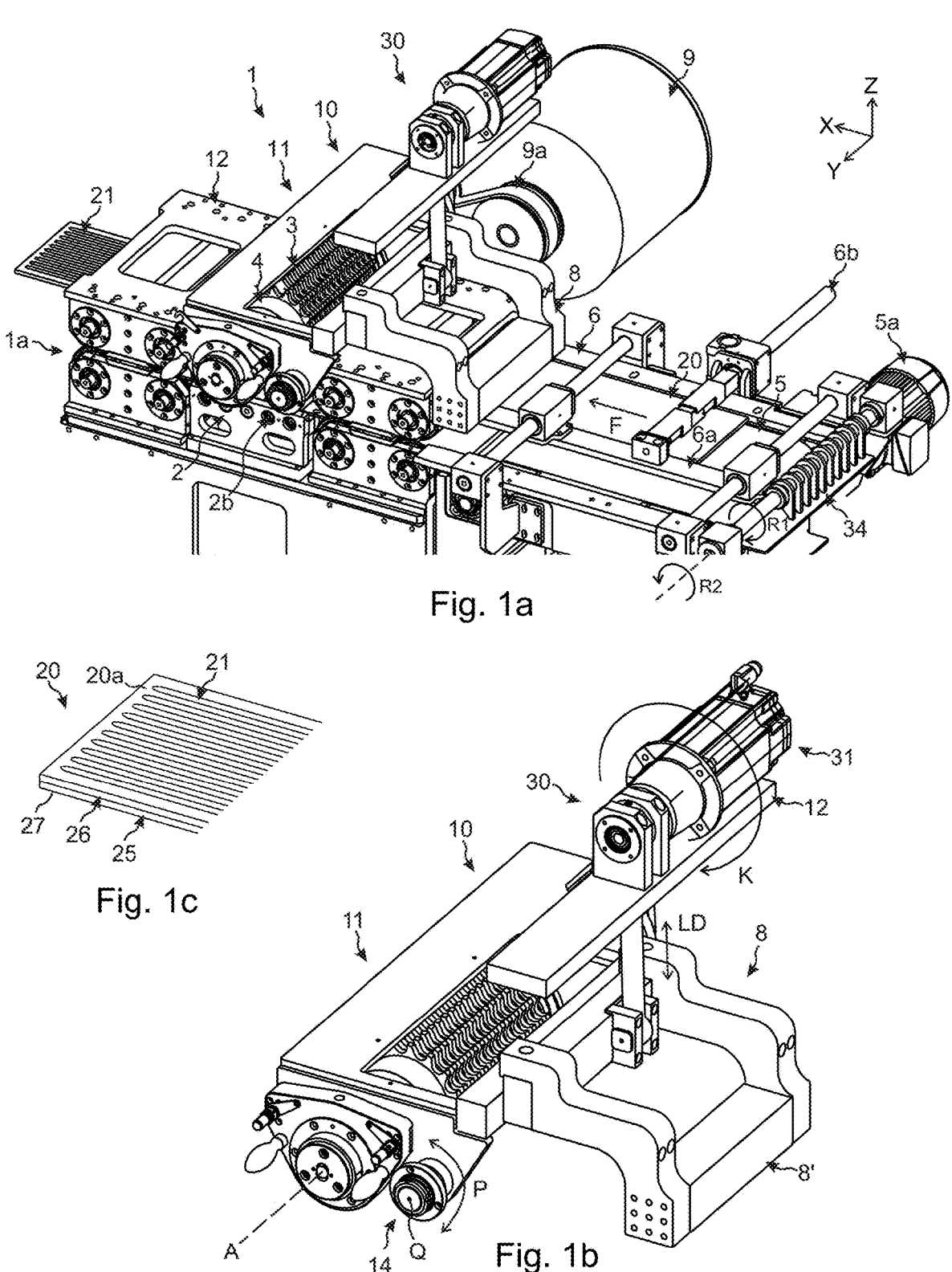

FIGS. 1a-1b, 2a-2b, 3a-3g, 4a-4c, 5a-5b, 6a-6d, 7a-7c and 8a illustrate embodiments of an arrangement 1 for forming grooves 21 in a board element 20, which, for example, may be or may be dividable into a building panel 20', such as a floor panel, see, e.g., the embodiments in FIGS. 1c and 7d-7e.

Generally herein, and as illustrated in FIG. 1c, the board element 20 or building panel 20', such as a substrate 25 and/or a lower layer arrangement 26 thereof, may comprise a thermoplastic material, such as polyvinyl chloride, PVC, polypropylene, PP, or polyethylene, PE, and a filler, such as a mineral material, e.g., chalk, calcium carbonate ($CaCO_3$), talc or stone material, but other materials, such as thermo-setting resins, such as a melamine formaldehyde resin, are equally conceivable. The grooves 21 may be formed in the substrate 25 and, when present in the board element or building panel, in a lower layer arrangement 26. For example, the lower layer arrangement 26 may comprise a balancing layer. Optionally, the board element may comprise a top layer 27 comprising a wear layer and/or a décor layer, such as a print layer.

Figures 3A, 3B, 3C, 3D, 3E, 3F, 3G:
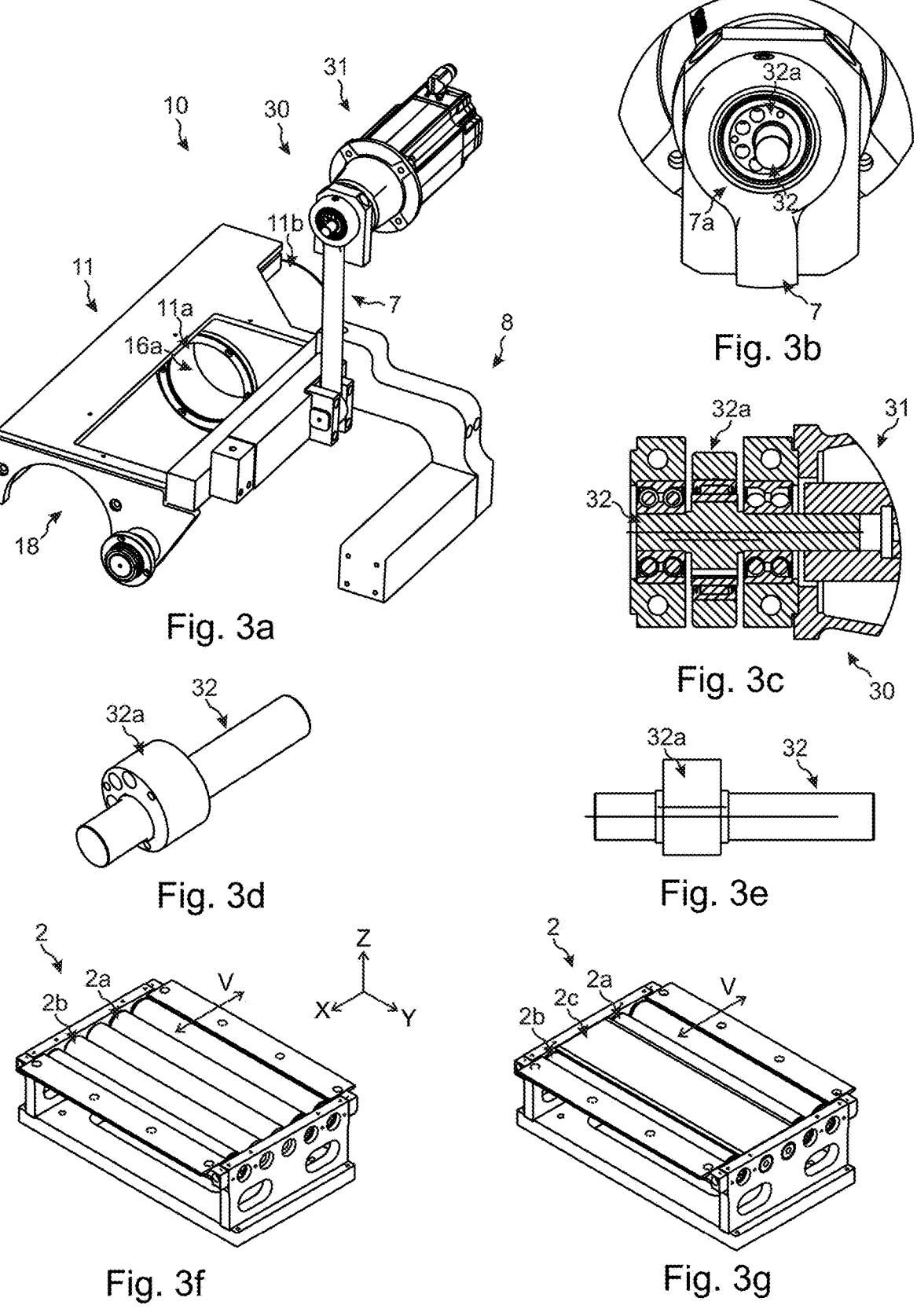
FIGS. 3a-3b illustrate embodiments of portions of the arrangement in FIG. 1a in a perspective view and in an enlarged perspective view.
FIGS. 3c-3g illustrate embodiments of a driving shaft and its connection to a driving device in an enlarged cross-sectional bottom view (FIG. 3c), a perspective view (FIG. 3d) and a front view (FIG. 3e), and embodiments of a support member in perspective views (FIGS. 3f-3g).

The arrangement 1 comprises a frame member 12 and a support member 2 for supporting the board element 20 during the forming of grooves 21. As shown in, e.g., FIGS. 1a, 3f and 3g, the support member may be embodied to be or to comprise rollers 2b, which may be rotatably arranged therein, but other embodiments thereof, such as a conveyor belt or a plate 2c, as shown in FIG. 3g, are equally conceivable.

The arrangement 1 further comprises cutting elements 3 arranged on a spindle member 4 configured to rotate around a rotational axis A. The cutting elements 3 are configured to rotate by means of the spindle member 4 and may be fixed thereto, for example by means of a cooperation between a recess 13a of the cutting element and a projection 4d of the spindle member, cf. FIGS. 7b-7c. The cutting elements 3 are configured to form the grooves 21 by removing material 22, such as chips, from the board element 20, see, e.g., FIG. 2a. In non-restrictive examples, an outer diameter of the cutting elements may be 120-250 mm, such as 150-190 mm and/or a rotational speed of the cutting elements during forming may be 3000-6000 rpm, such as 4000-5000 rpm.

Generally, herein, the arrangement 1 and its components may extend in a first X and a second Y horizontal direction and in a third vertical direction Z. A feeding direction F of the board element 20 and the rotational axis A of the spindle member 4 may be parallel with the first X and second Y directions, respectively. A transverse direction of the arrangement 1 may extend along the second direction Y.

The arrangement 1 may further comprise a feeding unit 5 for feeding the board element 20 along the feeding direction F, such as during forming of the grooves 21. A part of the support member 2 may be included in the feeding unit 5. The feeding unit 5, for example comprising rollers or a conveyor belt, may be driven by a driving element 5a, such as an electric motor. In non-limiting examples, a feeding speed of the board element may be 1-150 m/min, such as 80-130 m/min.

The arrangement may further comprise a pivot body 10 configured to be pivoted with respect to the support member 2, such as against and away from it. The pivot body 10 may be pivotable in a pivot direction P around a pivot axis Q, see, e.g., FIGS. 1b, 2a, 4b and 6d. The pivot body 10 may be pivotably arranged on the frame member 12, preferably by means of a pivot shaft 14 of the pivot body. The pivot axis Q may extend along a centre of the pivot shaft 14. The pivot axis Q and the rotational axis A may be offset, in the first direction X, by 50-800 mm, such as 100-300 mm, for example 150 mm.

The pivot body 10 may comprise a shaft unit 11 and a counterweight unit 8, which preferably are fixedly connected to each other.

The spindle member 4 may be pivoted between a released position and a forming position. The cutting elements 3, preferably the outer edges thereof, may be adapted to be spaced from the board element 20 in the released position and may be adapted to form the grooves 21 in the forming position. The outer edges of the cutting elements 3 may be spaced about 0-20 mm, preferably 0.1-10 mm, more preferably 0.5-5 mm, from the board element 20 in the released position. In non-limiting examples, the pivot body 10 may during use be pivotable around the pivot axis Q by an angle $\alpha$ of between $-10°$ and $10°$, preferably between $-5°$ and $5°$, more preferably between $-1°$ and $3°$, with respect to a reference angular position $\alpha_0$ of the pivot body, which for example may be aligned with the first horizontal direction X, cf. FIG. 2b. Thereby, the pivot body 10 may be vertically displaced by 0-40 mm, preferably 1-15 mm, more preferably 1.5-5.0 mm.

The shaft unit 11 may comprise the cutting elements 3, the spindle member 4, and a first 16a and a second 16b holding portion, see, e.g., FIGS. 1a-1b, 3a, 5b and 6d.

The counterweight unit 8 is adapted to at least partly counterbalance the shaft unit 11. A torque T of the counterweight unit 8 w.r.t. the pivot shaft 14 may be at least partially adapted to a torque of the shaft unit 11 w.r.t. the pivot shaft. For example, the torque T1 (T2) of the shaft unit (counterweight unit) may be a length L1 (L2) from the pivot shaft to its mass centre, times a mass M1 (M2) thereof, and times the acceleration of gravity (g=9.8 m/s²), see FIG. 4b.

The counterweight unit 8 may counterbalance the shaft unit 11 at least by 10%, preferably at least by 20% or at least by 40%. For example, the torque T2 of the counterweight unit, preferably around the pivot shaft 14, may be at least 0.1, preferably at least 0.2 or at least 0.4, times the torque T1 of the shaft unit, preferably around the pivot shaft 14. In some embodiments, $0.1 \leq T2/T1 \leq 0.5$, such as $0.2 \leq T2/T1 \leq 0.4$.

Figures 6A, 6B, 6C, 6D:
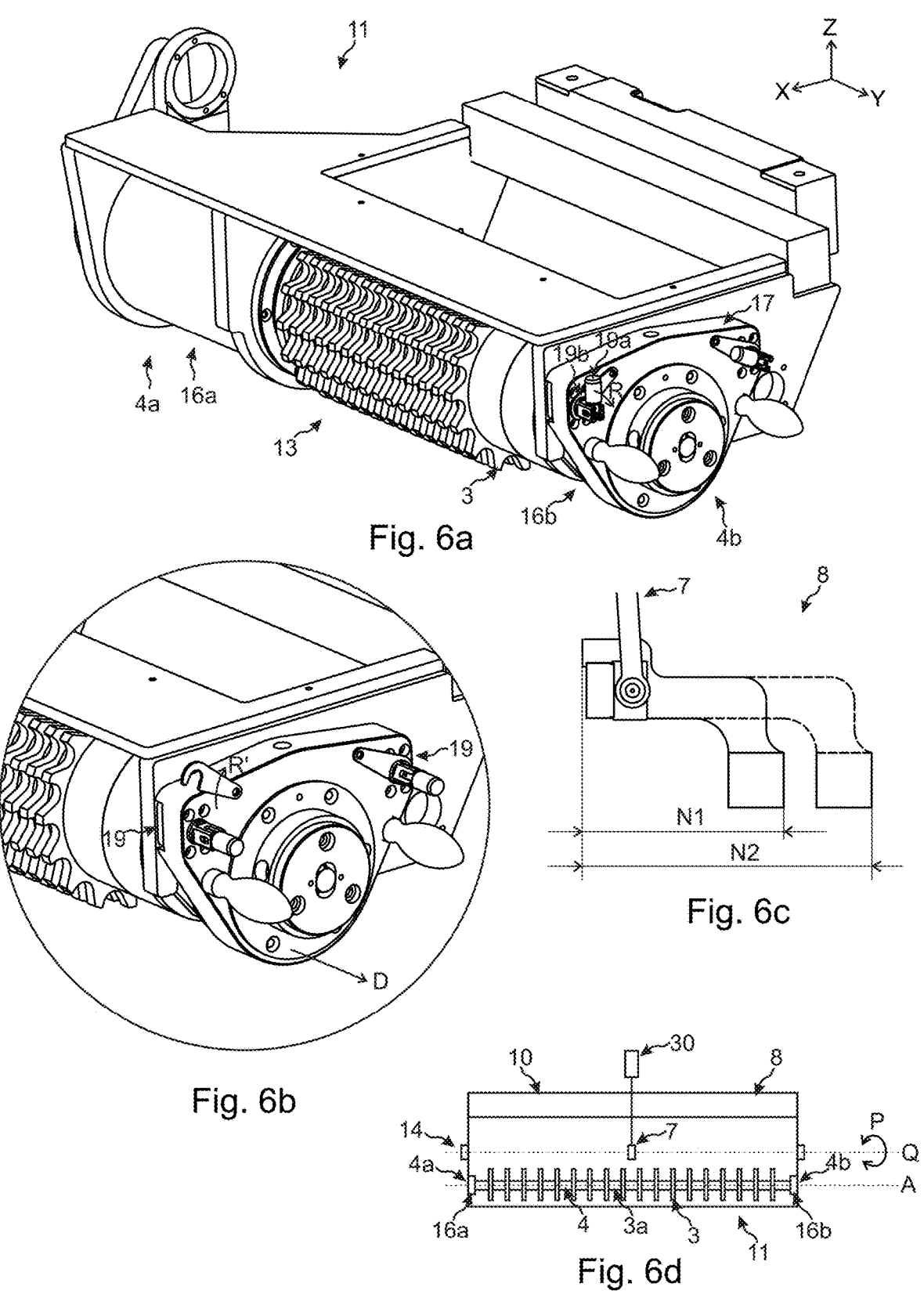
FIGS. 6a-6b illustrate embodiments of a shaft unit in perspective views.
FIGS. 6c-6d illustrate an embodiment of an adjustable counterweight unit and, schematically, an embodiment of a pivot body in a bottom view.

The counterweight unit 8 may comprise a weight element 8'. Preferably, the torque of the counterweight unit 8 is adjustable. In a first example, the counterweight unit 8 may be replaceably arranged in the pivot body 10. In a second example, the weight element 8' comprises at least one replaceable weight cartridge, see, e.g., FIG. 1b. In a third example, a length N of a portion of the counterweight unit 8 (cf. FIG. 2b) may be adjustable, see FIG. 6c showing two lengths N1 and N2>N1 of the adjustable counterweight unit.

The length N may extend along the first direction X, e.g., when the pivot body 10 is properly balanced.

A driving device 30 may be configured to drive the pivot body 10 such that it pivots. The pivoting may be actuated by a connecting arm 7 coupled to the pivot body 10. The driving device 30 may be fixedly mounted on the frame member 12 and may comprise a, preferably electric, motor 31, for example a servomotor, configured to rotate a driving shaft 32, see, e.g., FIGS. 3a-3e and 4c. A connecting portion 7a of the connecting arm 7 may be coupled, preferably eccentrically, to the driving device 30 via the driving shaft 32. An eccentric coupling 32a may be fixedly connected, preferably off centre, to the driving shaft 32 and may be rotatably journaled, preferably in bearings, within the connecting arm 7. For example, a bearing 7b may be provided between the eccentric coupling 32a and an interior opening 7c of the connecting portion 7a. For instance, the bearing 7b may be a slide bearing, a needle roller bearing, or a, preferably spherical, ball bearing. A periphery of the eccentric coupling 32a may have a circular form. During operation of the driving device 30, the connecting portion 7a, such as a fixed point thereof, may trace a non-circular, such as a substantially elliptical, path, cf. FIG. 3b. The connecting arm 7 may thereby move essentially linearly, such as essentially vertically, along a direction LD, see, e.g., FIGS. 1b and 5a.

Figures 2A, 2B:
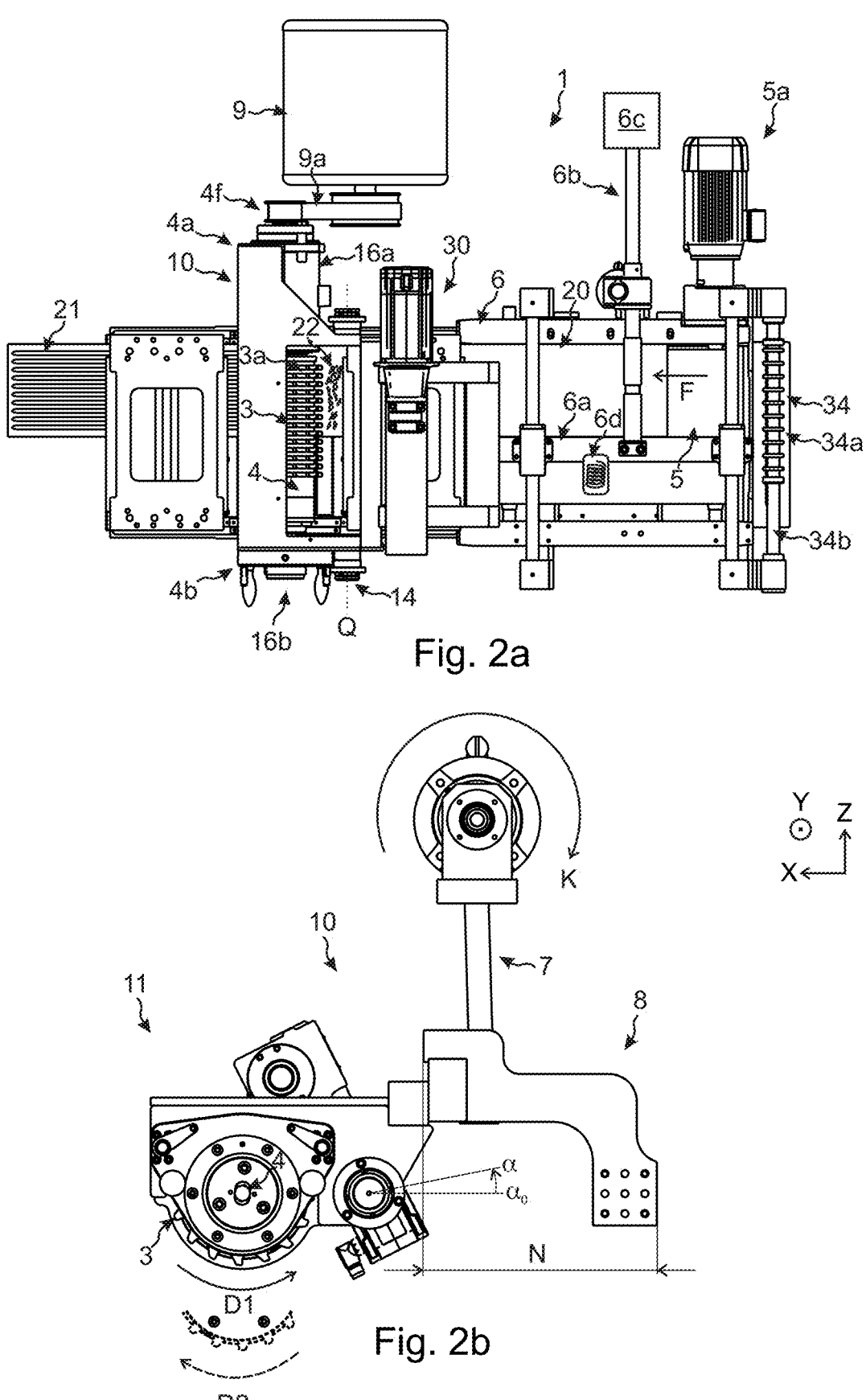
FIGS. 2a-2b illustrate the arrangement in FIG. 1a in a top view and a portion thereof including the pivot body in a side view.

Preferably, the driving device 30 is configured to rotate in a single direction K during a groove forming cycle, see, e.g., FIGS. 1b and 2b. For example, during the groove forming cycle, the cutting elements 3 may form grooves 21 by removing material 22 from the board element 20a along the feeding direction F in at least 50%, preferably at least 70%, more preferably at least 90%, of a length, such as a longitudinal length LL or a transverse length LT, of the board element, cf. FIGS. 7d-7e. Thereby, a total longitudinal extension LE of the grooves 21 may be at least 50%, preferably at least 70%, more preferably at least 90%, of said length LL or LT.

An ordinary skilled artisan will appreciate that, within the scope of the present disclosure, the eccentric coupling may be embodied differently, such as by a camshaft configuration or a linear actuator, such as an electro-hydraulic actuator (not shown).

Figures 4A, 4B, 4C:
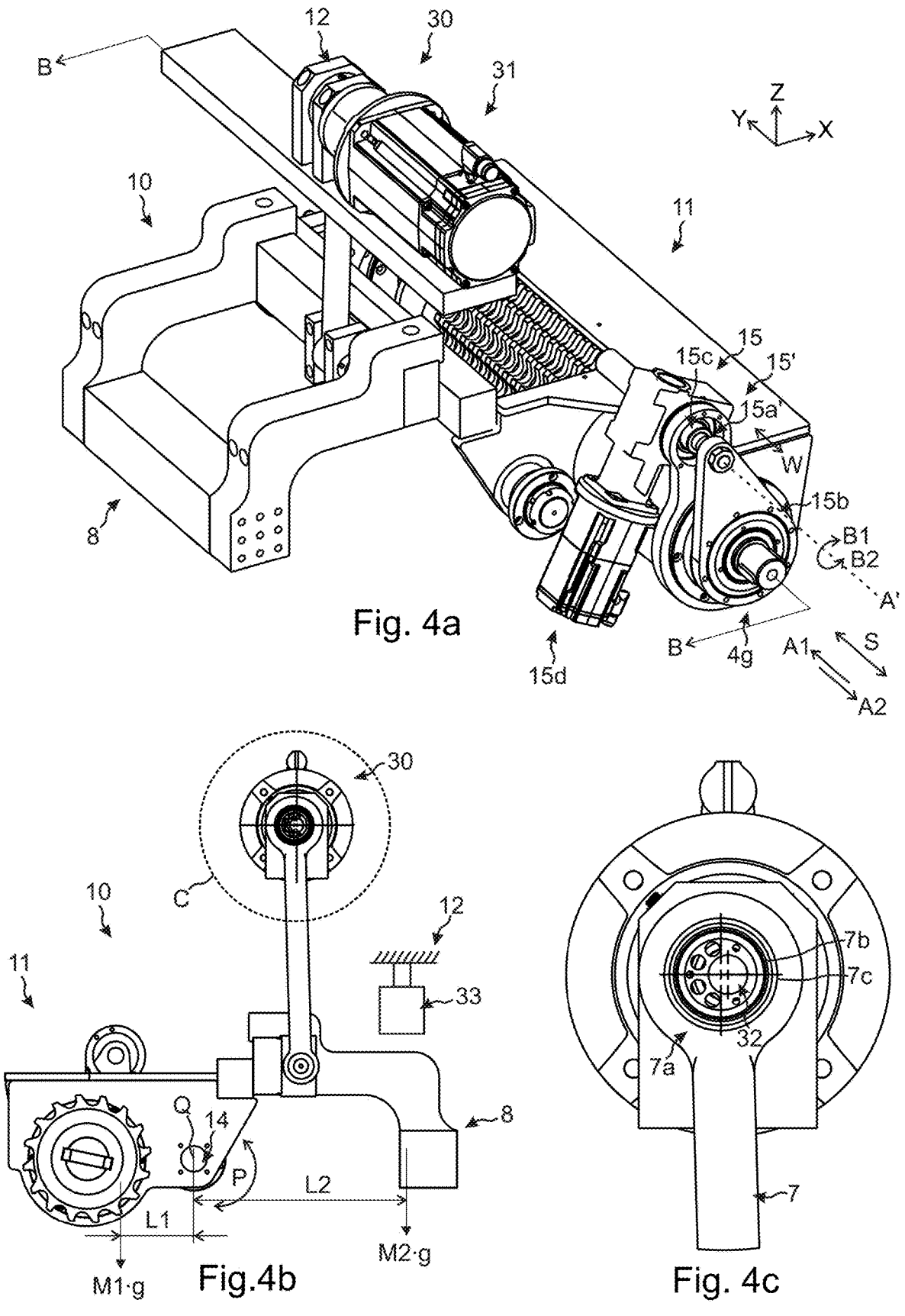
FIGS. 4a-4c illustrate embodiments of portions of the arrangement in FIG. 1a in a perspective view (FIG. 4a), a side view (FIG. 4b) and a side view (FIG. 4c) around the area C in FIG. 4b.

In some embodiments, and as schematically shown in, e.g., FIG. 4b, the arrangement 1 may further comprise a restriction member 33 configured to restrict the pivoting of the pivot body 10. For example, the restriction member 33 may comprise an elastic material, such as rubber. The restriction member 33 may be fixedly attached to the frame member 12.

As shown in, e.g., FIGS. 1a-1b, 2a, 4a, 5a-5b, 6a, 6d and 8a, both of a first 4a and a second 4b supporting portion of the spindle member 4 may be rotatably arranged in the pivot body 10. The supporting portions 4a, 4b may be provided in a respective end portion 4g of the spindle member along the rotational axis A. The pivot body 10 may comprise the first 16a and the second 16b holding portion through which the spindle member 4 may be provided, see, e.g., FIGS. 3a, 5a-5b, 6a-6b and 6d. For example, and as shown in, e.g., FIGS. 3a, 5a-5b and 6a-6b, at least portions of the first holding portion 16a may be integrally formed with the shaft unit 11, while the second holding portion 16b may be removably arranged to the shaft unit 11. In some embodiments, however, and as schematically illustrated in FIG. 6d, the second holding portion 16b may be integrally formed with the shaft unit 11.

The first holding portion 16a may be disposed in an inner housing 11a of the shaft unit 11. The inner housing 11a may be displaceable along the second direction Y with respect to an outer housing 11*b* of the shaft unit 11. There may be a bearing arrangement 16*e*, such as a slide bearing, provided between the inner and outer housings. The outer housing 11*b* may be fixedly arranged in the shaft unit 11. The first supporting portion 4*a* may be rotatably arranged in the inner housing 11*a* and may be fixed thereto in the second direction Y. Moreover, the second supporting portion 4*b* may be rotatably arranged in the second holding portion 16*b* and may be displaceable in relation thereto along the second direction Y. There may be a bearing arrangement 161, such as a slide bearing, provided between the second supporting portion 4*b* and the second holding portion 16*b*. Thereby, the spindle member 4 may be axially displaced within the shaft unit 11, optionally while the spindle member rotates.

Figure 5A:
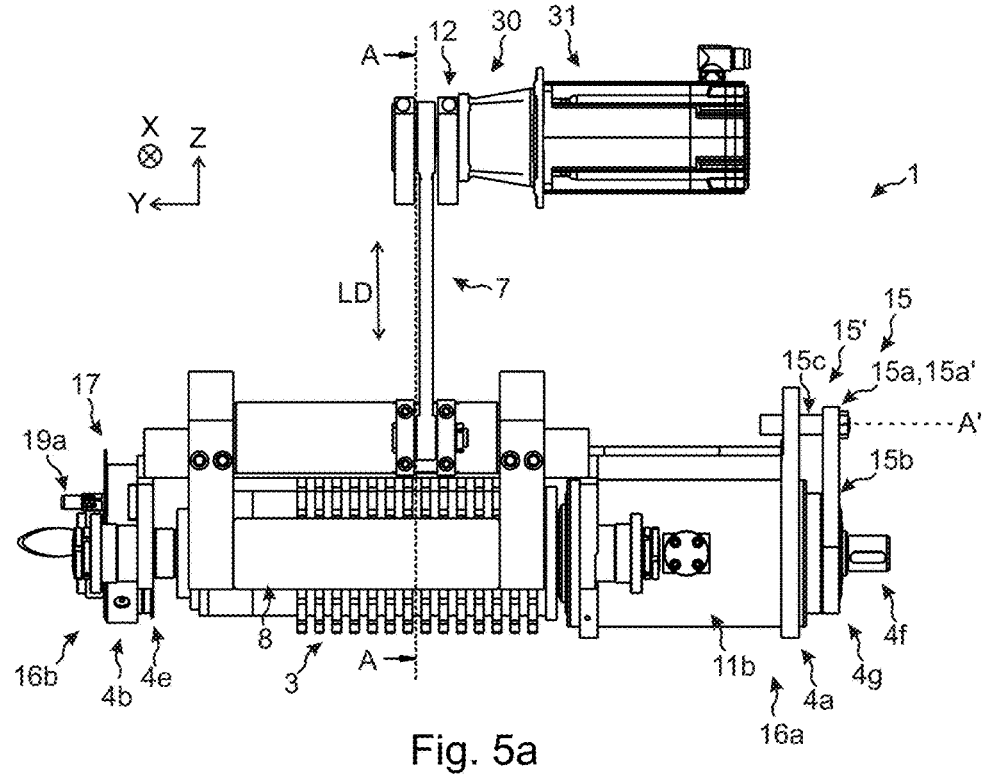
Figure 5B:
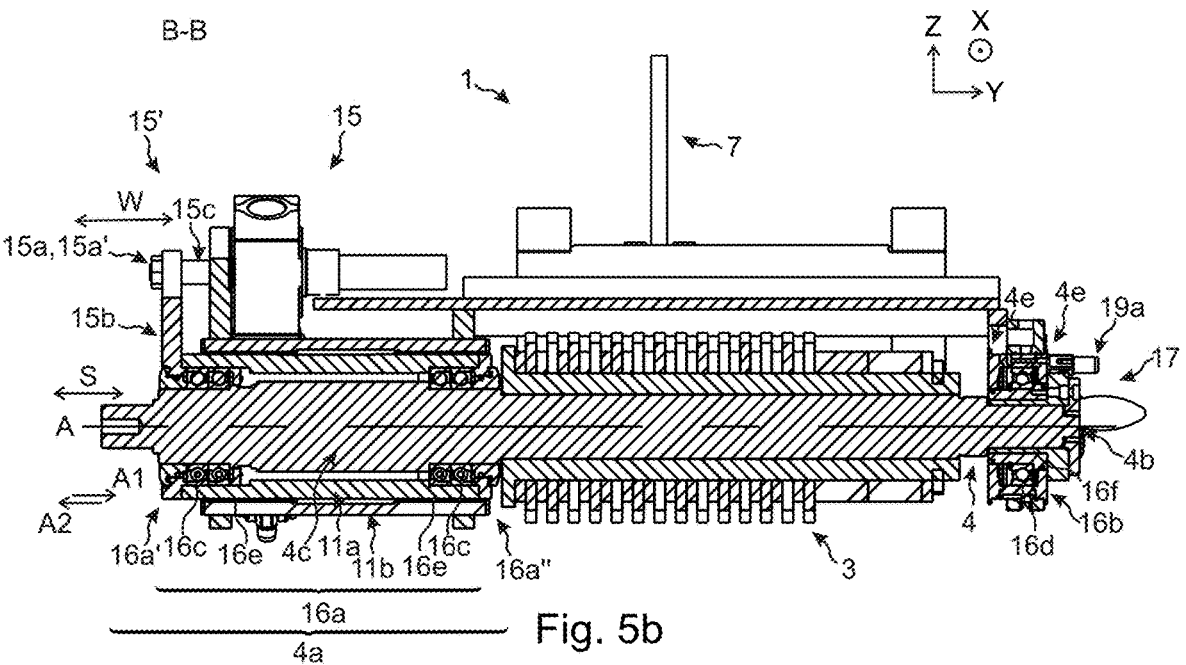

In some embodiments, the first 16*a* and/or second 16*b* holding portion(s) may consist of a single mounting area in which the supporting portions 4*a*, 4*b* may be rotatably arranged, see the schematic drawing in FIG. 6*d* as well as the area around the portions 4*b*, 16*b* in FIG. 5*b*. In some embodiments, and as shown in, e.g., FIG. 5*b*, the first holding portion 16*a* may consist of two mounting areas 16*a'*, 16*a"* in each of which the supporting portion 4*a* may be rotatably arranged. Thereby, the first supporting portion 4*a* may be doubly mounted. For example, the first supporting portion 4*a* may include an elongated portion 4*c* configured to be rotatably arranged in the pivot body 10 in the mounting areas 16*a'*, 16*a"*.

There may be a journal bearing 16*c*, 16*d*, such as a slide bearing, a roller bearing or an angular contact ball bearing, between the first 4*a* and second 4*b* supporting portions and the first 16*a* and second 16*b* holding portions, respectively. In the example of the previous paragraph, there may be a journal bearing 16*c*, such as those exemplified above, in each of the mounting areas 16*a'*, 16*a"*.

The second holding portion 16*b* may comprise a cover element 17 which may be fitted onto an opening 18 of the shaft unit 11, see FIGS. 3*a*, 5*a*-5*b*, 6*a*-6*b* and 7*a*-7*b*. A guiding element 19, preferably provided in a side part 11*c* of the shaft unit 11, may guide the cover element 17 into the correct position. The cover element 17 may be locked to the opening 18 by means of a locking element 19*a*, e.g., in the form of at least one handle being rotatable along a direction R, and/or at least one latch 19*b*, e.g., being rotatable along a direction R'. In non-limiting examples, the locking element 19*a* may be rotatable in the YZ-plane (i.e., around a normal thereto) and/or the latch 19*b* may be rotatable around the rotational axis A (in the XZ-plane). As shown in FIGS. 6*a* and 6*b*, respectively, the locking element 19*a* may assume a locked position and an unlocked position. In the unlocked position, the cover element 17 may be, preferably linearly, displaceable with respect to the shaft unit 11 along a direction D, which may extend in parallel with the rotation axis A.

An edge portion 4*f* of the spindle member 4 adjacent to the first supporting portion 4*a* may be configured to be rotatably driven by a drive unit 9, such as a, preferably electric, motor, see, e.g., FIGS. 1*a* and 2*a*. In non-limiting examples, a power of the drive unit, e.g., for 6-75, such as 12-50, cutting elements, may be 25-120 kW, such as 45-65 kW. Preferably, the drive unit 9 is, e.g., fixedly, arranged to the frame member 12 and may be connected to the pivot body 10 by means of a belt 9*a*, a chain or a universal joint.

Generally, herein, and as shown in, e.g., FIG. 2*b* the cutting elements 3 may rotate in an up-cut direction D1, but a rotation in a down-cut direction D2 is equally conceivable, provided that an orientation of the cutting elements is reversed, see the broken lines in FIG. 2*b* illustrating such an alternative embodiment of a lower portion of the shaft unit 11.

When the cutting elements 3 are adapted to rotate in the up-cut direction D1, it may be beneficial to include a blockage member 34 in the arrangement 1 located upstream of the cutting elements along the feeding direction F, see, e.g., FIGS. 1*a* and 2*a*. The blockage member 34 may allow for a board element 20 to be displaced along the feeding direction F and may prevent them from being displaced in an opposite direction thereto. It may comprise a plurality of blockers 34*a* which are rotatably attached to a rod 34*b*. Moreover, the blockage member 34, such as each of the blockers 34*a*, may be configured to be rotatable in a first rotational direction R1 and to be prevented from being rotated in a second, opposite, rotational direction R2. For example, the blockage member may be nonrotatable beyond a certain blocking angle of the blockage member w.r.t. the rod 34*b*, such as when the blockers face substantially downwards as shown in FIG. 1*a*. Thereby, the board element 20 may be prevented from being displaced against the feeding direction F as a result of the up-cut operation, e.g., should the cutting elements rapidly accelerate the board element backwards, e.g., before properly being able to remove material for forming the grooves 21.

As illustrated in, e.g., FIGS. 1*a* and 6*d*, the cutting elements 3 may be separately and removably arranged on the spindle member 4, which in turn may be arranged in a pivot body 10.

In some embodiments, however, and as shown in, e.g., FIGS. 6*a*-6*b* and 7*a*-7*b*, the cutting elements 3 may be arranged in a cutting module 13, which is removably arranged on the spindle member 4. The cutting elements 3 may be provided on a mounting member 13*d* of the cutting module 13 along a longitudinal axis E thereof and may be fixed thereto by a fixing member 13*c*, such as a nut element and a bolt element adapted to matingly engage with each other. The axes A and E may be parallel when the cutting module is arranged on the spindle member.

The cutting module 13 may be fixed to the spindle member 4 in a direction perpendicular to the rotational axis A, such as by at least one recess 13*a* and at least one projection 4*d* provided in the cutting module and on the spindle member, respectively, or vice versa. For example, FIG. 7*c* illustrates an embodiment of a spindle member 4 and of an inner portion 13*b* of a cutting module 13 (or a cutting element 3, cf. FIGS. 1*a* and 6*d*), which may be removably arranged on the spindle member. Furthermore, the cutting module 13 may be fixed to the spindle member 4 along the axial direction by means of the cover element 17.

According to the present embodiment, the cutting module 13 may be removed from the spindle member 4 by unlocking and removing the cover element 17 from the shaft unit 11, and thereafter displacing the cutting module 13 away from the spindle member 4 in a direction D', which preferably extends in parallel with the rotational axis A. The unlocking may be performed by unlocking the locking element 19*a* and/or the latch 19*b*, cf. the discussion above.

Generally, herein, for example when the cutting elements 3 are arranged separately on the spindle member 4 or provided in the cutting module 13, spacers 3*a* may be provided between the cutting elements 3, see, e.g., FIGS. 2*a* and 6*d*. Moreover, in non-limiting examples, there may be 6-75, such as 12-50 or 15-40, cutting elements separately arranged or provided in the cutting module.

In some embodiments, and as noted above, the spindle member 4 may be axially displaceable along the rotational axis A, i.e., in a linear manner. For example, the first 4a and second 4b supporting portions may be axially displaceable with respect to the first 16a and second 16b holding portions, cf. the discussion above. The axial displacement may be caused by a drive assembly 15, preferably a worm drive assembly 15', see, e.g., FIG. 4a and FIGS. 5a-5b. A displaceable component 15a of the drive assembly 15 may be, preferably fixedly, connected to, preferably an end portion 4g of, the spindle member 4 via a connection element 15b. For example, the displaceable component 15a may be a, preferably trapezoidal, screw member 15a' of the worm drive assembly 15' configured to rotate around a rotation axis A' for inducing a displacement of the connection element 15b.

The worm drive assembly 15' may further comprise a threaded insertion member 15c configured to matingly receive the screw member 15a'. A worm gear (not shown) may mesh with the screw member 15a' and may be driven by a driving machine 15d, such as an electric motor, preferably a servomotor or a stepper motor. When the driving machine 15d operates in a forward mode, the screw member 15a' may rotate around the rotation axis A' in a first rotation direction B1 and, when the operation of the driving machine 15d is reversed, in an opposite second rotation direction B2.

Thereby, an axial displacement caused by the drive assembly 15 (see arrow W) may induce an axial displacement of the spindle member 4 (arrow S). Depending on the operation of the driving machine 15d, the spindle member 4 may be axially displaceable in a first axial direction A1 directed, say, along the second direction Y, and in an opposite second axial direction A2 oriented in the opposite direction to the second direction Y. It is noted that the screw member 15a' is provided in an inner position of the insertion member 15c in FIGS. 5a-5b and in an outer position in FIG. 4a.

The spindle member 4 may be configured to be axially displaced more than 1 mm, such as 1-30 mm.

The shaft unit 11, such as the second supporting portion 4b shown in FIGS. 5a-5b, may comprise a stop member 4e, e.g., in the form of at least one flange, for example two flanges, such that the displacement of the spindle member 4 may become restricted along the second direction Y. The spindle member may thereby be axially displaceable between a first and a second position.

The arrangement 1 may comprise an aligning element 6, which preferably is fixed to the frame member 12, and a positioning element 6a, which preferably is displaceable along the transverse direction (second direction Y), e.g., by means of a bar 6b, whose displacement, for example, may be driven by a motor 6c (schematically shown in FIG. 2a). Optionally, the positioning element 6a may be biased towards the aligning element 6 (i.e., in FIGS. 1a-1b in a direction antiparallel to the second direction Y). For example, the bias may be implemented by a spring element 6d, see the schematic illustration in FIG. 2a.

In some embodiments, the support member 2 may comprise at least two separated support elements 2a which are displaceable (see arrow V in FIGS. 3f-3g) along the feeding direction F, such as the first direction X. The support elements 2a, such as the rotatably arranged rollers 2b, may be separated along the feeding direction F. Moreover, the support elements 2a may be displaceable, preferably simultaneously, by means of a displacement unit, which may comprise a, preferably linear, actuator unit (not shown) and which in some embodiments even may be operable manually. For example, the actuator unit may comprise a ball screw configuration or a worm drive configuration. The support elements 2a may be attached to oblong apertures of the frame member 12 by means of attaching members, such as screws, such that the support elements may be displaceable within the apertures.

Alternatively, or in addition, to the separated support elements 2a, the arrangement 1 may comprise an obstruction element, which is described on page 12, line 31 to page 14, line 14, page 24, lines 9-18, page 33, lines 10-18, and page 39, line 29 to page 41, line 32 and shown in FIGS. 1, 8a-8d, 9a-9h, 10a-10b, 16a-16d and 16f-16g in WO 2020/180237 A1. These parts are hereby incorporated herein by reference.

In some embodiments, a core part 1a of the arrangement 1, for example comprising the frame member 12 and optionally the drive unit 9, may be essentially symmetric under a 180 degree rotation around the vertical direction Z, see, e.g., FIGS. 1a and 8a. The core part 1a may be configured to receive a pivot body 10 adapted to form grooves 21 when the board element is fed along the feeding direction F as well as along an opposite feeding direction F'. Hence, the core part 1a may be configured to receive a pivot body 10, e.g., in accordance with any of the embodiments described herein, as well as to receive a reversed pivot body 10' which may be essentially a mirror version of the pivot body 10.

The arrangement 1 in, e.g., any of FIGS. 1a-1b, 2a-2b, 3a-3g, 4a-4c, 5a-5b, 6a-6d, 7a-7c and 8a, is capable of implementing a method for forming grooves 21 in a board element 20. The flow chart in FIG. 8b illustrates an embodiment of such a method (Box 40).

First, the board element 20 may be fed along the feeding direction F, F' and is arranged in contact with the support member 2 (Box 41). Before or during the forming of the grooves 21, at least a part of the arrangement 1 may optionally be positioned towards a more appropriate forming position. For example, the spindle member 4 may be axially displaced along the rotational axis A and/or the separated support elements 2a may be displaced along the feeding direction F, F' (Box 42).

Next, the spindle member 4 is pivoted with respect to the support member 2 (Box 43), preferably by rotatably driving the pivot body 10 by the driving device 30 in a single direction K during a groove forming cycle. Thereby, grooves 21 may be formed in a rear side 20a of the board element by removing material 22 therefrom by the cutting elements 3 (Box 44). The board element 20 may then optionally be divided into at least one, such as at least two, building panel(s) 20', such as a floor panel(s) (Box 45), see FIGS. 7d and 7e. As also shown in these figures, a single group 21a and at least two groups 21a of grooves 21 may be formed in the board element 20 or panel 20' by pivoting the pivot body 10 against the support member 2 one time and at least two times, respectively. Finally, a locking device 23a, 23b for horizontal and/or vertical locking of adjacent panels may optionally be formed on long 24a and short 24b edges of the panel. The locking device 23a and/or 23b may comprise a tongue 28a and a groove 28b for vertical locking and a locking element 29a and a locking groove 29b for horizontal locking. The tongue 28a may be integrally formed with, and separately formed from, the substrate 2 on the long 24a and short 24b edge, respectively. Embodiments of the locking device 23a, 23b may be similar to the locking device 9 in FIGS. 4a-4c and page 15, lines 17-22 of WO 2022/050891, which hereby is incorporated by reference.

Example

The method described above in relation to FIG. 8b was successfully tested with 30 cutting elements arranged in a cutting module using a rotational speed of 4500 rpm and a diameter of 180 mm of the cutting elements, a board feeding speed of 120 m/min and a power of 55 kW of the drive unit. Moreover, the parameters of the shaft unit and the counterweight unit were M1=40 kg, L1=0.15 m, M2=25 kg and L2=0.09 m, which gave a counterbalancing of T2=0.37·T1. The test confirmed the technical effects and advantages of the embodiments and examples described herein.

Aspects of the disclosure has mainly been described above with reference to a few embodiments. However, as is readily appreciated by a person skilled in the art, other embodiments than the ones disclosed above are equally possible within the scope of the disclosure. For example, it is understood that the arrangement in any of the embodiments described herein, such as in FIGS. 1a-1b, 2a-2b, 3a-3g, 4a-4c, 5a-5b, 6a-6d, 7a-7c and 8a, may comprise a cutting module 13 or a plurality of separate cutting elements 3 as shown in FIG. 6d. The various aspects described herein may be combined. For example, components of the arrangement 1 described in relation to, e.g., FIGS. 1a-1b, 2a-2b, 3a-3g, 4a-4c, 5a-5b, 6a-6c, 7a-7c and 8a, such as the arm 7, the member 12, the module 13, the device 30, the shaft 32, are also conceivable in the embodiment in FIG. 6d. In addition, in some exemplary embodiments, FIGS. 1a-1b, 2a-2b, 3a-3g, 4a-4c, 5a-5b, 6a-6c, 7a-7b and 8a, represent drawings that are drawn to scale.

Embodiments

Further aspects of the disclosure are provided below. Embodiments, examples etc. of these aspects are largely analogous to the embodiments, examples, etc., as described above, whereby reference is made to the above for a detailed description.

Item 1. An arrangement (1) for forming grooves (21) in a board element (20) comprising:
a support member (2) for supporting the board element (20) during said forming, and
at least one cutting element (3) arranged on a spindle member (4) configured to rotate around a rotational axis (A), said cutting element(s) (3) being configured to form said grooves (21) by removing material (22) from the board element (20).

Item 2. The arrangement according to item 1, further comprising a feeding unit (5) for feeding the board element (20) along a feeding direction (F; F').

Item 3. The arrangement according to item 1 or 2, wherein the spindle member (4) is arranged in a pivot body (10) configured to be pivoted with respect to the support member (2).

Item 4. The arrangement according to item 3, further comprising a driving device (30) configured to drive the pivot body (10), wherein the driving device (30) is configured to rotate in a single direction (K) during a groove forming cycle.

Item 5. The arrangement according to item 3 or 4, wherein the pivoting is actuated by a connecting arm (7) coupled to said pivot body (10), said connecting arm being further coupled to a driving device (30).

Item 6. The arrangement according to item 5, wherein the connecting arm (7) is coupled eccentrically to the driving device (30).

Item 7. The arrangement according to any of the preceding items 3-6, wherein the pivot body (10) comprises a counterweight unit (8) and a shaft unit (11) comprising the spindle member (4), said counterweight unit (8) being adapted to at least partly counterbalance the shaft unit (11).

Item 8. The arrangement according to any of the preceding items 3-7, further comprising a restriction member (33) configured to restrict the pivoting of the pivot body (10).

Item 9. The arrangement according to any of the preceding items 3-8, wherein both a first (4a) and a second (4b) supporting portion of said spindle member (4) are rotatably arranged in the pivot body (10).

Item 10. The arrangement according to item 9, wherein an edge portion (4f) of the spindle member (4) adjacent to the first supporting portion (4a) is configured to be rotatably driven by a drive unit (9).

Item 11. The arrangement according to any of the preceding items, wherein a plurality of cutting elements (3) are arranged in a cutting module (13), which is removably arranged on the spindle member (4).

Item 12. The arrangement according to any of the preceding items, wherein the spindle member (4) is axially displaceable along the rotational axis (A).

Item 13. The arrangement according to item 12, wherein the axial displacement is caused by a worm drive assembly (15').

Item 14. The arrangement according to any of the preceding items, wherein the support member (2) comprises at least two separated support elements (2a) which are displaceable along a feeding direction (F; F') of the board element (20).

Item 15. The arrangement according to item 14, wherein the separated support elements (2a) are rollers (2b).

Item 16. A method for forming grooves (21) in a board element (20), comprising:
arranging the board element in contact with a support member (2), and
forming at least one groove (21) in a rear side (20a) of the board element by removing material (22) from the board element by at least one cutting element (3) arranged on a spindle member (4) configured to rotate around a rotational axis (A).

Item 17. The method according to item 16, further comprising feeding the board element (20) along a feeding direction (F; F').

Item 18. The method according to item 16 or 17, comprising pivoting the spindle member (4) with respect to the support member (2) during said forming.

Item 19. The method according to item 18, further comprising driving a pivot body (10) in which the spindle member (4) is arranged by a driving device (30) configured to rotate in a single direction (K) during a groove forming cycle.

Item 20. The method according to item 18 or 19, comprising actuating the pivoting by a connecting arm (7) coupled to a pivot body (10) in which the spindle member (4) is arranged.

Item 21. The method according to item 20, wherein the connecting arm (7) is coupled eccentrically to a driving device (30).

Item 22. The method according to any of the preceding items 18-21, wherein a counterweight unit (8) at least partly counterbalances a shaft unit (11) comprising the spindle member (4).

Item 23. The method according to any of the preceding items 18-22, further comprising restricting the pivoting of the spindle member (4) by means of a restriction member (33).

Item 24. The method according to any of the preceding items 16-23, wherein both a first (4*a*) and a second (4*b*) supporting portion of said spindle member (4) are rotatably arranged in a pivot body (10).

Item 25. The method according to any of the preceding items 16-24, wherein a plurality of cutting elements (3) are arranged in a cutting module (13), which is removably arranged on the spindle member (4).

Item 26. The method according to any of the preceding items 16-25, wherein the spindle member (4) is axially displaceable along the rotational axis (A).

Item 27. The method according to any of the preceding items 16-26, wherein the support member (2) comprises at least two separated support elements (2*a*) which are displaceable along a feeding direction (F, F') of the board element (20).

Item 28. The method according to item 27, wherein the separated support elements (2*a*) are rollers (2*b*).

The invention claimed is:

1. An arrangement for forming grooves in a board element comprising:
   a support member for supporting the board element during said forming,
   at least one cutting element arranged on a spindle member configured to rotate around a rotational axis, said cutting element(s) being configured to form said grooves by removing material from the board element, and said spindle member being arranged in a pivot body configured to be pivoted with respect to the support member, and
   a driving device configured to drive the pivot body such that it pivots, wherein the driving device is configured to rotate in a single direction during a groove forming cycle.

2. The arrangement according to claim 1, further comprising a feeding unit for feeding the board element along a feeding direction.

3. The arrangement according to claim 1, wherein the pivoting is actuated by a connecting arm coupled to said pivot body, said connecting arm being further coupled to the driving device.

4. The arrangement according to claim 3, wherein the connecting arm is coupled eccentrically to the driving device.

5. The arrangement according to claim 1, wherein the pivot body comprises a counterweight unit and a shaft unit comprising the spindle member, said counterweight unit being adapted to at least partly counterbalance the shaft unit.

6. The arrangement according to claim 1, further comprising a restriction member configured to restrict the pivoting of the pivot body.

7. The arrangement according to claim 1, wherein both a first and a second supporting portion of said spindle member are rotatably arranged in the pivot body.

8. The arrangement according to claim 7, wherein an edge portion of the spindle member adjacent to the first supporting portion is configured to be rotatably driven by a drive unit.

9. The arrangement according to claim 1, wherein a plurality of cutting elements are arranged in a cutting module, which is removably arranged on the spindle member.

10. The arrangement according to claim 1, wherein the support member comprises at least two separated support elements which are displaceable along a feeding direction of the board element.

11. An arrangement for forming grooves in a board element comprising:
   a support member for supporting the board element during said forming, and
   at least one cutting element arranged on a spindle member configured to rotate around a rotational axis, said cutting element(s) being configured to form said grooves by removing material from the board element, and said spindle member being arranged in a pivot body configured to be pivoted with respect to the support member,
   wherein both a first and a second supporting portion of said spindle member are rotatably arranged in the pivot body, and
   wherein the spindle member is axially displaceable along the rotational axis.

12. The arrangement according to claim 11, further comprising a feeding unit for feeding the board element along a feeding direction.

13. The arrangement according to claim 11, further comprising a driving device configured to drive the pivot body such that it pivots, wherein the driving device is configured to rotate in a single direction during a groove forming cycle.

14. The arrangement according to claim 11, wherein the pivoting is actuated by a connecting arm coupled to said pivot body, said connecting arm being further coupled to a driving device.

15. The arrangement according to claim 14, wherein the connecting arm is coupled eccentrically to the driving device.

16. The arrangement according to claim 11, wherein the pivot body comprises a counterweight unit and a shaft unit comprising the spindle member, said counterweight unit being adapted to at least partly counterbalance the shaft unit.

17. The arrangement according to claim 16, wherein an edge portion of the spindle member adjacent to the first supporting portion is configured to be rotatably driven by a drive unit.

18. The arrangement according to claim 11, wherein a plurality of cutting elements are arranged in a cutting module, which is removably arranged on the spindle member.

19. The arrangement according to claim 11, wherein the axial displacement is caused by a worm drive assembly.

20. The arrangement according to claim 11, wherein the support member comprises at least two separated support elements which are displaceable along a feeding direction of the board element.

\* \* \* \* \*